United States Patent [19]

Ritter et al.

[11] 3,853,386

[45] Dec. 10, 1974

[54] LOW-LOSS, HIGHLY REFLECTIVE MULTILAYER COATING SYSTEM FORMED OF ALTERNATE HIGHLY REFRACTIVE AND LOW-REFRACTIVE OXIDE LAYERS

[75] Inventors: Elmar Ritter, Vaduz; Hans K. Pulker, Triesen, both of Liechtenstein

[73] Assignee: Balzers Patent-und Beteiligungs-AG, Balzers, Furstentum, Liechtenstein

[22] Filed: Sept. 6, 1973

[21] Appl. No.: 394,574

[30] Foreign Application Priority Data
Sept. 19, 1972 Switzerland.................. 13713/72

[52] U.S. Cl................ 350/164, 117/33.3, 350/1, 350/288
[51] Int. Cl............................................. G02b 5/28
[58] Field of Search................ 350/1, 288, 163–166; 117/33.3

[56] References Cited
FOREIGN PATENTS OR APPLICATIONS
358,249  12/1961  Switzerland........................ 350/1

OTHER PUBLICATIONS
Hass et al., "Jour. of Vacuum Sciene and Technology", Vol. 4, No. 2, April 1967, pp. 71–79.

*Primary Examiner*—Ronald J. Stern
*Attorney, Agent, or Firm*—McGlew and Tuttle

[57] ABSTRACT

A low-loss, highly reflective multilayer system for coating a substrate comprises alternate layers of high refraction and low-refraction oxide layers whose low-refraction layers comprise a low-absorption oxide of silicon and whose high refraction layers comprise titanium oxide, and wherein at least the three last high refraction layers located on the side of the system which is opposite to the substrate side comprises zirconium oxide.

4 Claims, 1 Drawing Figure

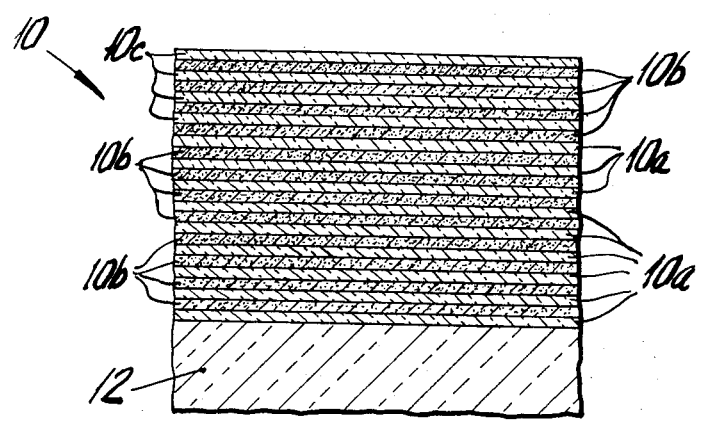

LOW-LOSS, HIGHLY REFLECTIVE MULTILAYER COATING SYSTEM FORMED OF ALTERNATE HIGHLY REFRACTIVE AND LOW-REFRACTIVE OXIDE LAYERS

FIELD AND BACKGROUND OF THE INVENTION

This invention relates in general to optical coating constructions and, in particular, to a new and useful low-loss, highly reflective multilayer coating system formed of alternate highly refractive and low-refraction oxide layers.

DESCRIPTION OF THE PRIOR ART

The present invention relates to optical multilayer systems of alternately superposed highly refractive and low-refraction dielectric layers whose structure and manufacture in general and for special purposes has been described in many publications.

Multilayer systems of this type may be applied to most various substrates such as lenses, plain plates, reflecting bodies or the like, and serve to permit certain wave lengths of the electromagnetic radiation in the optical range (ultraviolet, visible light, infrared) to pass through and, on the contrary, to reflect others.

Dielectric multilayer arrangements are used for optical purposes above all in cases where minimum losses are required. One of the most critical applications of this kind are so-called laser mirrors. Any losses on the mirror used to this end immediately affect the power output of the laser. The problem here is not only to manufacture a mirror having the least possible losses, but also to preserve the quality of the mirror. It has been proven that at a temperature of over 200°C and when simultaneously exposed to the low pressure of the ambient gas atmosphere, the dielectric multilayer systems used for laser mirrors and made, for reasons of mechanical and chemical stability, preferably of oxide layers, are subjected to changes increasing the losses. Presumably, the oxides used for the manufacture of the mirror are subjected to a partial dissociation, that is, they give off a part of the oxygen combined therein and, since most of the oxides are lacking in oxygen or suboxides, show an optical absorption. That oxides under low pressure and increased temperature may decompose is known and consistent with the lost established experience made while depositing by the vacuum evaporation of originally non-absorbing oxides, layers are obtained whose absorption is stronger than would correspond to the initial substances. In this case, once more, at a higher temperature and in the vacuum, the oxides are subjected to a dissociation. As it is known, the so-called reactive evaporation has been developed in which, provided oxide layers are to be produced, the evaporation is carried out in a low pressure $O_2$-atmosphere in order to stop the dissociation or perhaps to invert it by the oxygen present and thus to obtain layers as non-absorptive as possible. This method of evaporation has been disclosed in the U.S. Pat. No. 2,920,002.

However, the optical absorption of the layers and the light dispersion on the crystals of which a layer is formed produce losses. Therefore, a change of the layer structure under thermal influence could also be a cause of the increased losses.

Tests have been made confirming the practical experience of the layers with lasers. At the same time, it has been found that at temperatures of about 200°C, in many oxide layers, particularly also in the highly refractive titanium oxide layers frequently used because of their high index of refraction and their excellent mechanical resistance, hardness and adhesive strength (and, in general, chemical stability), when they are simultaneously exposed to a low pressure gas atmosphere (vacuum), the losses strongly increase. In air under atmospheric pressure, this effect does not occur.

It is not easy to dispense with the titanium oxide layers in such multilayer systems and to substitute therefor layers of more stable oxides. That is, most of the other oxides, insofar as they would be practically eligible for the formation of low-loss highly refractive layers in view of their hardness, adhesive strength and behavior during the evaporation, have a lower index of reflection. And, the less the difference in the index of refraction of the highly refractive and low-refraction layers used for the formation of an alternate layer system is, the more the individual layers must be superposed to obtain a predetermined optical effect. The use of a larger number of layers has the disadvantage that the losses increase because there are no absolutely loss-free layers and, for example, a double number of layers results in two times greater losses. Therefore, in general, a replacement in a layer system of the highly refractive oxide layers by layers of an oxide which is not so highly refractive but more stable against decomposition, is not an advantageous solution.

What has been said of titanium oxide layers, applies of course also to layers of other oxides which can become absorbent under vacuum or in a low pressure atmosphere at an increased temperature.

SUMMARY OF THE INVENTION

The present invention provides a solution for formation of multilayer systems which are resistant to increased temperatures under low pressure.

The inventive low-loss highly reflective multilayer system is formed of alternate highly refractive and low-refraction oxide layers, in which the low-refraction layers comprise a low-absorption silicon oxide and which includes highly refractive layers of titanium oxide and at least the three last highly refractive layers deposited at the side opposed to the substrate having the layers of the system are layers of zirconium oxide.

It has been proven that multilayer systems of such structure are substantially less subjected, if at all, to loss increases due to thermal influence in low pressure conditions. This is the more surprising as a single zirconium oxide layer which might be deposited as the uppermost layer in a layer system, does not produce this effect, not even when its thickness is equal to the sum of thicknesses of the $ZrO_2$ layers provided by the invention. Such a single layer, as has been shown, may even lead to increased losses, the cause of which is not yet clear. This phenomenon is perhaps due to the fact that thicker layers have a more coarse structure causing more stray light. It is true that for the sum of thicknesses of the zirconium oxide layers in a layer system, in accordance with the invention, a certain minimum value is also recommendable, it seems, however, that a plurality of inner layers of zirconium oxide behave, in respect to the light diffusion, more favorable than a single layer of the same thickness. The lower value of the sum of thicknesses of the zirconium oxide layers used in accordance with the invention is approximately 200 nm. The number of the $ZrO_2$-layers to be recommended depends on whether the layer system must be formed, for optical reasons, of thicker or thinner single layers. In the individual case, of course, it matters also how high the temperature is to which the system will be exposed and what the requirements on the stability are. Therefore, an exact value of the mentioned sum of thicknesses cannot be indicated.

Accordingly, it is an object of the invention to provide a low-loss highly reflective multilayer system for coating a substrate comprising alternate layers of low refraction layers of a low-absorbtion oxide of silicon and high refraction layers of titanium oxide and with the last high refraction three layers on the side opposed to the substrate comprising zirconium oxide.

For an understanding of the principles of the invention, reference is made to the following description of a typical embodiment thereof as illustrated in the accompanying drawing.

BRIEF DESCRIPTION OF THE DRAWING

The only FIGURE of the drawing is a detailed transverse sectional view of a layer system constructed in accordance with the invention.

GENERAL DESCRIPTION OF THE PREFERRED EMBODIMENT

As an example of a layer system formed in accordance with the invention, the invention comprises a highly reflective mirror coating 10 as shown in the drawing. The coating 10 is applied to a plain glass plate or substrate 12 and comprises 17 layers, alternately of titanium oxide 10a and silicon dioxide (or $Si_2O_3$) 10b, and eight additional layers of which the low-refraction layers are also made of $SiO_2$ or $Si_2O_3$ 10b while the highly refractive ones are layers of zirconium dioxide 10c.

Thus, the layer system comprises a total of 25 single layers beginning with a highly refractive layer deposited on the glass substrate and ending on the side of the system opposed to the substrate, by a highly refractive layer of $ZrO_2$. For the given purpose, all of the layers have an optical layer thickness (=Product of the geometrical thickness and the index of refraction) of $\lambda/4$, where $\lambda$ means the wave length at which the mirror has to show a maximum reflection. The entire system is formed as follows:

| No. of the layer: | 0, | 1, | 2, | 3, | 4, | 5, | 6, | 7, | 8, | 9, | 10, | 11, | 12, | 13, |
|---|---|---|---|---|---|---|---|---|---|---|---|---|---|---|
| Glass/ | | T | S | T | S | T | S | T | S | T | S | T | S | T |
| | 14, | | 15, | | 16, | | 17, | | 18, | | 19, | 20, | 21, | 22, | 23, | 24, | 25, |
| | S | | T | | S | | T | | S | | Z | S | Z | S | Z | S | Z | where every $S$, $T$, and $Z$ indicates a layer with the optical thickness of $\lambda/4$ consisting, respectively, of silicon oxide, titanium oxide and zirconium oxide.

The mirror is manufactured in a most simple manner, known in itself, by vacuum evaporation. The mentioned substances for the layers may be evaporated, as many other oxides, directly by the electron beam, or advantageously, the layers may be deposited by the mentioned method of reactive evaporation.

The following values of reflection $R$ and transmission $T$ have been determined for the above-described highly reflecting mirror:

$$R = 99.77\%$$
$$T = 0.08\%$$

loss value $\quad V = 0.15\%$

For another mirror of the same structure, the following values have been measured:

$$R = 99.77\ \%$$
$$T = 0.09\ \%$$
$$V = 0.14\ \%$$

For both of the mirrors, the reflection maximum was approximately at 633 nm.

Thereafter, the mirrors were heated for 2 hours in a furnace capable of evacuation, at a low pressure of $6 \times 10^{-6}$ Torr, up to 300°C and kept in the furnace for a further 2 hours for cooling. Air has been admitted only after the cooling down. The following resulting values have been found for the reflection and transmission of the mirrors thus treated:

$$R = 99.77\ \%$$
$$T = 0.11\ \%$$
$$V = 0.12\ \%$$

and $$R = 99.77\ \%$$
$$T = 0.07\ \%$$
$$V = 0.16\ \%$$

This means that, taking into account the accuracy of measurement, none of the mirrors has suffered notable changes through the annealing.

By way of contrast, the following values have been measured on a reference mirror composed of 21 alternate layers of $TiO_2$ and $SiO_2$ (that is, without $ZrO_2$-layers):

Before the Annealing:

$$R = 99.65\ \%$$
$$T = 0.32\ \%$$
$$V = 0.03\ \%$$

This reference mirror has also been annealed for 2 hours at $10^{-6}$ Torr and 300°C, in the same manner as the above-described mirrors. After annealing, the measured values were:

$$R = 99.42\ \%$$
$$T = 0.17\ \%$$
$$V = 0.41\ \%$$

As may be seen, the measurements show that the losses of the mirror have strongly increased.

When using a small number of single layers, layer systems are obtained which have a small reflection power, and consequently, an increased transmission. For example, with only 13 to 17 layers, a reflection between 95 percent and 99 percent is obtained. Such partially transmissive layer systems are also used in many fields, and the present invention can be applied thereto analagously by forming at least the three uppermost highly refractive layers deposited on the side of the system which is opposite to the substrate, of zirconium dioxide.

In individual practical cases, it cannot be recommended to substitute $ZrO_2$-layers for a greater number of $TiO_2$-layers than is necessary for the given purpose because $ZrO_2$ has a lower index of refraction than $TiO_2$ and such substitution would entrain a superfluous and undesirable increase in the number of layers.

The surprising effect of a small number of $ZrO_2$ layers at the indicated location in the layer system can perhaps be explained so that the protection of the $TiO_2$ layers which are nearer to the substrate, against any change is not at all necessary. Particularly as far as a mirror is concerned, the outermost layers are substantially more important, even if it is not possible to dispense with the underlying layers in order to obtain a sufficiently high reflection. However, it is not necessary in this case that these underlying layers have or maintain the same high degree of freedom from losses as the outer layers.

As for the low-refraction layers of the system, experience shows that here the problem of the loss increases under thermal influence does not exist. For these layers, the known stable layer substances can be used and particularly layers of $SiO_2$ or $Si_2O_3$ have proven to be suitable.

While a specific embodiment of the invention has been shown and described in detail to illustrate the application of the principles of the invention, it will be understood that the invention may be embodied otherwise without departing from such principles.

What is claimed is:

1. A low-loss, highly reflective multilayer system for coating a substrate comprising alternate layers of high refraction and low-refraction oxide layers whose low-refraction layers comprise a low-absorption oxide of silicon and said high refraction layers comprise titanium oxide, and wherein at least the three last high refraction layers located on the side of the system which is opposite to the substrate side comprises zirconium oxide.

2. A multilayer system, according to claim 1, wherein the sum of the thicknesses of the zirconium oxide layers is at least 200 nm.

3. A multilayer system, according to claim 1, wherein the thickness of the zirconium oxide layers is $d = (1/n)(\lambda/4)$ where $n$ is the index of refraction of the layer and $\lambda$ is the wave length of the maximum of reflection.

4. A multilayer system, according to claim 1, wherein there are 25 layers alternately from the substrate of titanium oxide and silicon dioxide up to the 18th layer and seven alternate layers thereafter of zirconium dioxide and silicon dioxide with the outermost layer being zirconium dioxide.

* * * * *